United States Patent [19]

Lester et al.

[11] 4,202,068
[45] May 13, 1980

[54] PORTABLE SCRUBBING TOOL

[75] Inventors: Frank R. Lester, Boynton Beach, Fla.; James Bullard, Adair, Okla.

[73] Assignee: Nuvite Chemical Compounds Corporation, Brooklyn, N.Y.

[21] Appl. No.: 960,633

[22] Filed: Nov. 14, 1978

Related U.S. Application Data

[63] Continuation-in-part of Ser. No. 944,354, Sep. 21, 1978.

[51] Int. Cl.² ............................................. A46B 13/02
[52] U.S. Cl. ........................................................ 15/28
[58] Field of Search ............... 15/23, 24, 28, 29, 53 R, 15/98, 97 R, 103, 180; 173/168, 169; 16/115; 403/104, 351; 51/180; 30/276

[56] References Cited

U.S. PATENT DOCUMENTS

| 689,464 | 12/1901 | Cramer | 15/103 |
|---|---|---|---|
| 1,353,741 | 9/1920 | Goldstone | 15/103 |
| 1,419,356 | 6/1922 | Brown | 15/103 |
| 1,679,323 | 7/1928 | Mortlock | 15/29 |
| 2,062,820 | 12/1936 | Pierce | 30/276 |
| 2,526,415 | 10/1950 | Refsdal | 403/351 |
| 2,559,295 | 7/1951 | Grossenbacher | 15/98 |
| 3,268,935 | 8/1966 | Ungeheuer | 15/21 R |
| 3,431,573 | 3/1969 | Frandsen | 15/29 X |
| 3,688,139 | 8/1972 | Yaguchi | 15/29 X |
| 4,037,369 | 7/1977 | Campbell | 15/180 |
| 4,102,290 | 7/1978 | Weiss | 15/24 X |

Primary Examiner—Edward L. Roberts
Attorney, Agent, or Firm—Fleit & Jacobson

[57] ABSTRACT

A lightweight pneumatic powered portable scrubbing tool is disclosed, having a scrubbing brush member that is rotated by a cylindrically-shaped elongated air powered motor. The motor shaft is affixed to the brush member and supports the brush member. The motor housing is pivotally connected to an elongated main support pole, having an air supply hose disposed therewithin and along the length thereof. The air supply hose exits, through a union, from a peripheral portion of the main support pole and is interconnected with the motor. A fitting is mounted on an opposite end of the main support pole, i.e., remote from the motor, for interconnection with a fluid source through an air hose. An extension support pole fits over the main support pole and can be extended to a preselected position along the length of the main support pole. Rotation of the extension support pole in either direction relative to the main support pole permits locking of the extension pole to the main pole.

20 Claims, 8 Drawing Figures

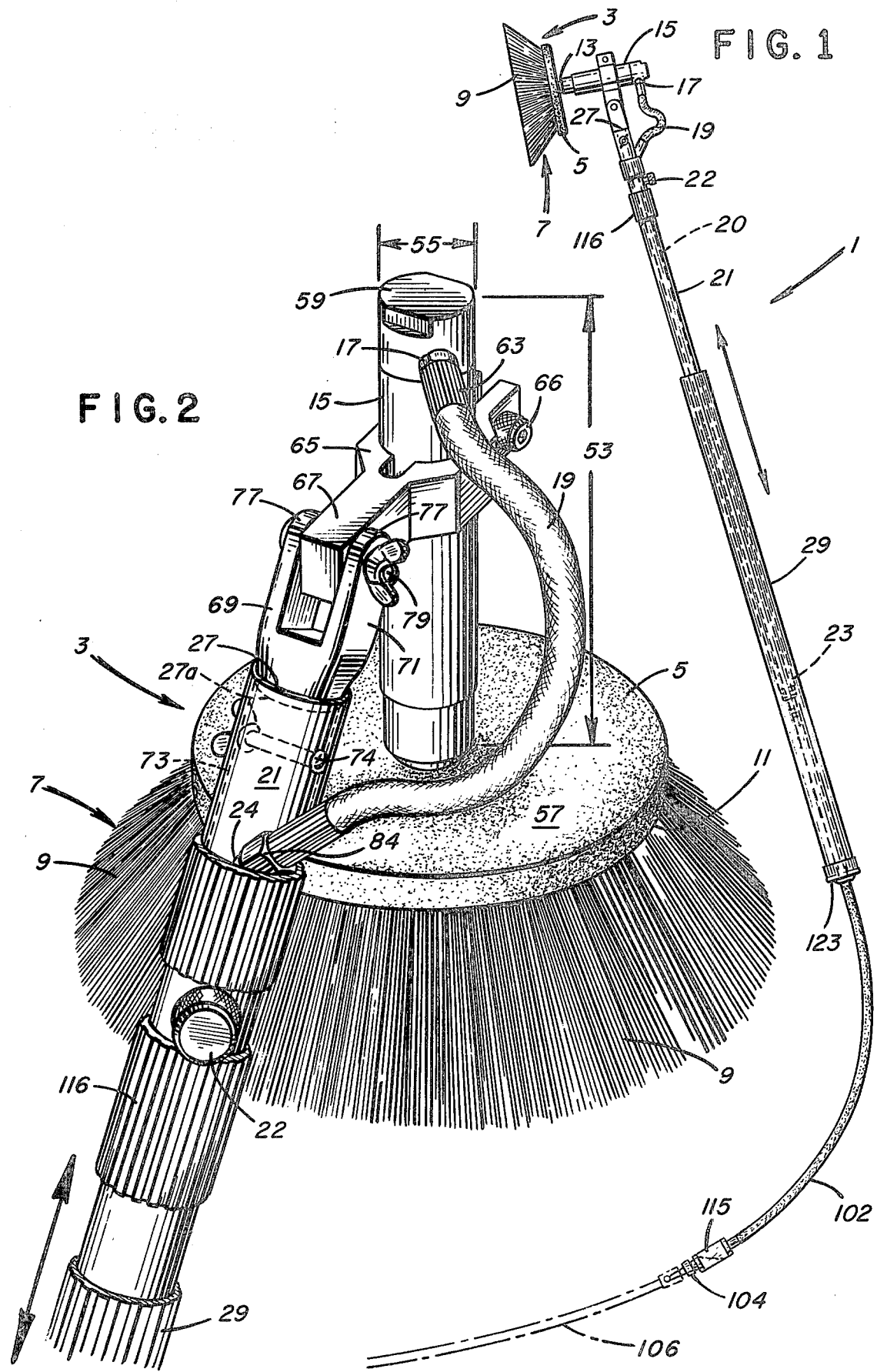

PORTABLE SCRUBBING TOOL

CROSS-REFERENCE TO RELATED APPLICATIONS

This application is a continuation-in-part application of Ser. No. 944,354, filed on Sept. 21, 1978.

BACKGROUND OF THE INVENTION

The invention relates to a portable, lightweight, and easily maneuverable scrubbing tool comprising a pneumatically powered scrubbing brush interconnected with an elongated tubular, hand-held main support pole for the cleaning or scrubbing of relatively large, irregular surfaces, such as aircraft exteriors. The scrubbing tool also has applicability to polishing, buffing, brightening, and paint stripping.

In the cleaning of exterior aircraft surfaces, a detergent is sprayed onto the surface of the aircraft and then, for proper cleaning, the aircraft surface must be agitated by a brush in order to break the adhesive factor of the soil to the surface. The surface is then rinsed with water for completion of the cleaning procedure. It is known in the art to accomplish the agitation process with hand scrub brushes that are attached to wooden handles of various sizes. The cleaning operator manually agitates the surface of the aircraft by a back and forth scrubbing action which is time consuming and inefficient.

Certain rather sophisticated apparatus for cleaning surfaces of aircraft are known, as shown in U.S. Pat. No. 3,648,316. Such a system requires a carriage that is positioned adjacent the aircraft and having extensible booms interconnected with the carriage. Such devices are complex and costly, both to manufacture and maintain.

Also known in the art are a variety of rotary brushes used for cleaning a variety of surfaces. Examples of such prior art brushes include those disclosed in U.S. Pat. Nos. 1,369,567; 2,000,930; 3,074,088; 3,153,799; and 3,864,780. The present invention has advantages over these prior art brush systems as will be apparent from the description below.

SUMMARY OF THE INVENTION

The invention relates to an improved portable scrubbing or cleaning tool, comprising a rotary scrubbing tool brush member powered by a pneumatic motor, or turbine, particularly an air-, or other noncombustible gas-, powered motor. The motor supports the scrubbing tool brush member and is narrowly shaped so as not to interfere with the surfaces to be cleaned during the cleaning operation. The motor and brush are interconnected with an elongated, tubular, main support pole to be held by the operator. The support pole is pivotally connected to the motor so that the brush member and motor unit can be angularly positioned with respect to the main support pole for cleaning difficult to reach surfaces. An extension pole fits over the main support pole and can be extended to a preselected position along the length of the main support pole. Rotation of the extension pole in either direction relative to the main pole permits locking of the extension pole to the main pole.

It is a primary object of the present invention to provide an improved scrubbing brush tool for cleaning large structures that have irregular, or hard-to-reach surfaces. The invention has particular utility for cleaning the exterior surfaces of aircraft, although it can also be successfully employed in the cleaning of other large surfaces such as trucks, buses, buildings, and other commercial industrial cleaning jobs. The scrubbing tool has a number of interchangeable brushes with different functions; one brush is particularly suited to agitate the surface of the body to be cleaned in order to break down the adhesive factor between the soil and the surface. The scrubbing tool of the present invention is easily maneuverable, portable, and of light weight in order to clean such hard to reach areas as the aircraft flap well areas, gear well areas, fuselage, landing gears, cargo compartments, etc.

It is an object of this invention to provide a light weight and easily maneuverable scrubbing tool that is capable of adjustable extensions to different positions. It is further an object of the invention to provide a safe, power-operated tool that is operated by an air or other noncombustible gas motor, specifically avoiding electrically powered motors.

It is still further an object of the present invention to provide a scrubbing tool having a brush member supported on a light weight, compact, air-powered motor, the latter being cylindrically shaped, having a length substantially greater than the diameter thereof, so that the motor can be attached to the brush member as a unit, without interfering with the surfaces to be cleaned during the cleaning operation. In particular, it is an object of the present invention to provide a motor interconnected with a brush, wherein the motor is of a size so as not to extend beyond the periphery of the brush, and thus not interfere with the surfaces to be cleaned.

Still further, it is an object of the present invention to provide an air hose disposed within the main support pole for protecting the air hose during operation.

Another object of the present invention is to provide a portable scrubbing tool that is quickly and easily extensible to reach remote positions. An extension support pole is adjustably and selectively positioned over the main support pole, concentric therewith. The extension pole can be extended out and twist-locked by a novel locking mechanism at selected positions relative to the length of the main support pole.

It is also an object of the present invention to provide a disc brush having a circular mounted plate with bristles arranged circumferentially around the plate. The bristles at the annular surface of the mounting plate, adjacent the periphery of the plate are of a longer length than the inner bristles to catch any cleaning compound that is thrown by the inner bristles outward.

These and other objects of the invention will become readily apparent when reference is made to detailed description and the accompanying drawings.

BRIEF DESCRIPTION OF THE DRAWINGS

FIG. 1 is an overall side view of the scrubbing tool of the present invention.

FIG. 2 is a perspective view of the bottom end of the scrubbing tool.

DETAILED DESCRIPTION OF THE DRAWINGS

Figure 3:
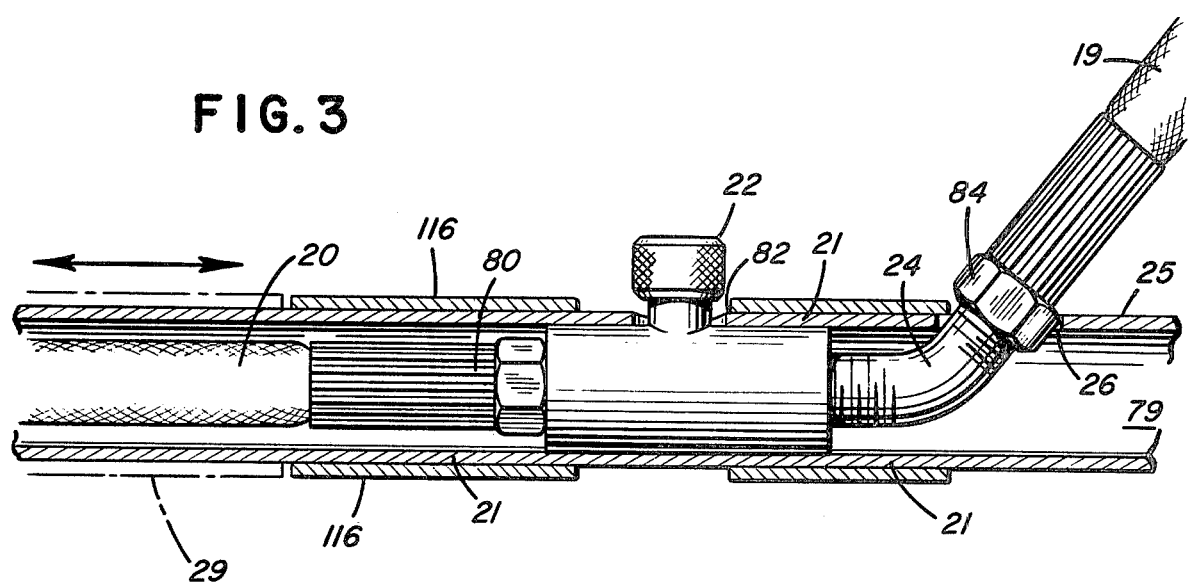
FIG. 3 is a partial cross-section view of the lower end of the main support pole.

Referring to the drawings, a lightweight, portable, pneumatic powered scrubbing tool 1 is disclosed and includes a scrubbing brush member 3 having a mounting plate 5 and a brush 7 comprising a plurality of brush bristles 9 affixed to one surface 11 of the plate. The mounting plate 5 is centrally connected to a drive shaft 13 of a slim, light weight, air-, or noncombustible gas-, powered motor 15 of generally cylindrical shape. Near the top end of the motor is a male air hose fitting 17 for receiving a pneumatic fluid supply hose 19. A main support pole 21 is pivotally connected to the motor. The main support pole 21 is tubular, hollow, and has a flexible pneumatic fluid supply hose 20 extending from one end 23 of the main support pole 21 toward the other end 27 of the main support pole 21, where it connects with a shut-off and control valve 22, connected to a 45° union 24 that exits through an opening 26 at the periphery 25 of the main support pole. A hose 19 connects to the union 24 and is interconnected with the motor 15. An extension support pole 29 fits over the main support pole 21 and is extensible and lockable along the length of the main support pole 21, to be described further below.

A number of different types of brushes can be provided. The scrubbing brush member 3 comprises a substantially circular plate 5, preferably of hard rubber or plastic, of approximately six (6) inches in diameter. On one surface 11 of the circular plate 5 is a plurality of brush bristles 9 that are arranged around the plate, preferably in concentric rings of varying diameter. Disposed closest to the center of the plate and arranged to form an annulus around the center of the plate, are relatively hard bristles 30, suitable for scrubbing. These bristles 30 are shown to be substantially perpendicular to the plate 5, although they could be inclined at an angle with respect to the plate surface. Disposed annularly around the hard bristles 30 are softer bristles 32 suitable for polishing, of substantially the same length as the hard bristles 30. Disposed about the softer bristles 32, adjacent the periphery of the plate 5, are soft, elongated bristles 34, disposed at an angle A with respect to the plane of the plate 5 and disposed outwardly. These long bristles 34 are preferably approximately 50% longer than the shorter bristles. By angularly inclining at least the peripheral bristles 34, it can be seen that the diameter of the brush bristles 34, at their free end, is greater than the diameter of the plate. This affords a clearance C between the periphery of the plate 5 and the periphery of the free ends of the brush bristles 34. Thus, when the scrubbing tool 1 is applied to a surface to be cleaned, the plate 5 will not interfere with any irregular surfaces of the particular area being cleaned.

The longer length of the brushes 34 at a peripheral annular portion of the plate 5, provides a cup to retain the cleaning compound, either solid or liquid, from being hurled outward. Any cleaning compound that is thrown outward is caught by the longer bristles 34 and retained within the scrubbing brush area.

Centrally disposed in the plate 5 is a hole 49 that receives the drive shaft 13 of the motor 15. The plate 5 is fixedly secured to the motor drive shaft 13 by means of a bolt or screw 45 that is sunk directly into the motor shaft 13. The bolt 45, along with a washer 47, prevent the plate from sliding downwardly off of the drive shaft 13. The drive shaft 13 is round in cross-section and the plate 5 is force-fit onto the shaft 13. If, during operation, the brush should get caught, or retained in some manner, the motor shaft 13 will slip within the hole 49 of the plate, thus preventing any backlash to the operator, and preventing damage to the motor.

The brush member 3, including the plate 5 and brush bristles 9, is light weight, preferably less than six (6) pounds. The brush member 3 and the motor 15 comprise the unit that is to be positioned adjacent the surfaces to be cleaned, and thus, the overall weight of the unit must be sufficiently light weight for good maneuverability.

A cone brush 36 can also be used with the scrubbing tool of the present invention. The cone brush is a substantially conically shaped bristle arrangement having a screw 38 centrally mounted at the underside thereof. This screw is adapted to screw directly into the motor drive shaft 13. A cone brush is desirable when cleaning difficult-to-reach and small areas, such as landing gears and flap wells of aircraft.

Another brush arrangement that can be used is a circular disc attachment 40 which is mounted onto the drive shaft 15 in a manner similar to the scrubbing brush member 3, above-described. A soft cloth buffer, such as a chamois, in the form of a mitten 42, can be designed to fit around the disc 40 to provide an effective polishing cloth. The bottom surface 44 of the disc 40 can be burred, or roughened, not shown, and is adapted to engage a pad, such as a scouring pad. Friction between the scouring pad and the burred surface of the disc 40 is sufficient to maintain the pad thereon. As an alternative, one can use the flat disc 40 and provide a tape, not shown, permanently affixed to the underside 44 of the disc 40 wherein the tape has a burred surface to engage a scouring pad.

The motor 15 is a pneumatic motor, preferably an air powered motor, although a motor powered by some other noncombustible gas under pressure can be employed. The motor 15 is lightweight and of compact size so that no portion of the motor overhangs, or extends beyond the periphery of the brush plate 5, or the disc 40, or the maximum diameter 44 of the cone brush 36, or of any other attachment that might be designed for this invention. This enables the brush member 3 to be easily positioned in confined regions of the surface to be cleaned without the motor 15 colliding with and damaging the surfaces. This is, of course, extremely desirable when cleaning aircraft surfaces, wherein it is essential that no damage be done to critical aircraft parts adjacent the cleaning surface.

The motor 15 is preferably a cylindrically-shaped motor having a length 53 substantially greater than the diameter 55 thereof. Preferably, the motor length 53, exclusive of the motor shaft, is approximately four inches and the diameter is approximately one inch, although other lengths can be used. A typical motor that can be employed, with modification, is the motor no. 7538-A manufactured by the Aro Corporation. The horsepower of the motor can vary and is preferably between 0.15 to 0.25 Hp.

At one end of the motor 15 is the motor drive shaft 13 which permits the motor 15 to be mounted so that its major axis, i.e., along its length, is substantially perpendicular to the top surface 57 of the circular plate 5, thus minimizing any interference between the motor 15 and the surface to be cleaned. Adjacent the opposite end 59 of the motor, extending radially from the motor, is an air-hose fitting 17, preferably a male fitting for receiving a mating female fitting 63 on the air hose 19 to supply the fluid source. Such fittings are well known in the art.

Surrounding the motor 15 and fixedly secured thereto is a motor sleeve 65. The sleeve 65 may be permanently secured to the motor 15 and integral therewith, or it may be removably secured to the motor 15 by means of any suitable connection such as a screw or a bolt 66. The motor sleeve 65 has, integral therewith, a radially extending flange 67. The flange 67 is adapted to be pivotally connected to a bracket 69, whch, in turn, is connected to the main support pole 21, in a manner to be described below.

The bracket 69 is a unitary element, preferably made of metal, having a U-shaped portion 71 integral with a cylindrical rod 73. The U-shaped bracket 71 has a pair of legs 77 that are positioned over the radial flange 67 of the motor sleeve 65. A bolt 79 interconnects the legs 77 of the U-shaped bracket 71 to the radial flange with a close, yet freely movable, fit to permit rotary or pivotal movement. The bracket 69 must pivot, or rotate, with respect to the major axis of the motor 15 at least 45°, and preferably 135°.

The cylindrical rod 73, integral with the U-shaped bracket 71, is adapted to fit within a hollow portion 79 of the tubular main support pole 21. A bolt 74 or other suitable locking arrangement secures the rod 73 within the main support pole.

The main support pole 21 is a hollow, tubular pole, preferably of aluminum, and is of a sufficient length to enable the operator to reach remote areas of the surface to be cleaned. A four (4) foot long pole is preferable. Disposed within the pole 21 is a flexible pneumatic fluid conveying hose 20, such as an air hose. The air hose 20 is preferably a ¼ inch high pressure hose. The air hose 20 extends substantially from one end 23 of the tubular pole 21, through the length of the pole 21, and connects to a shut-off, control valve 22. Control valve 22 can be manually adjusted by the operator to shut off the air supply through hose 20 to hose 19, and can be adjusted by the operator to vary the quantity of air flowing therethrough. Air hose 20 is connected with control valve 22 by means of a permanent fitting 80. Control valve 22 is disposed through an opening 82 in the main support pole 21 for easy manipulation by the operator. Control valve 22 is a conventional shut off and control valve.

Connected to the opposite side of control valve 22 is a union 24, which is angled at 45° to exit through opening 26 of the main support pole 21. The union is connected with a permanent fitting 84 to air hose 19, which, in turn, is connected to the motor as described above. Air hose 20 extends through main support pole 21 toward the opposite end 23 of the main support pole in a manner to be described.

Mounted at end 23 of the main support pole is a cylindrical mounting block 86 that is securely mounted in the end opening of main support pole 21. This cylindrical mounting block 86 is secured to the main support pole 21 by means of a screw 88, which has its head removed. The block has an opening 90, which is adapted to receive and retain a hollow pipe 92 therethrough. The opening 90 is off-set from the major axis of the main support pole 21, the purpose to be described below. The pipe 92 is threaded at both ends 94, 96. One end 94 of the pipe 92 is interconnected with a fitting 98, which permanently clamps air hose 20 thereto. The opposite end 96 of the pipe 92 is threadingly engaged with a fitting 100, which is securely interconnected with an intermediate air hose 102 that has a fitting 104 on its opposite end, preferably a quick-disconnect fitting, for connection to a main supply air hose 106 for receiving the air under pressure. Air is received from a compressor, as is described in the copending parent application, Ser. No. 944,354.

Disposed around the pipe 92 is a twist-lock engaging member 108. This member 108 is cylindrically shaped with a hole 110 extending therethrough for receiving the pipe. The cylindrically-shaped member is rotatable about the pipe, and its outer diameter is substantially equal to the outer diameter of the main support pole 21. Washers 112 are provided on either side of the member, wherein the washers 112 engage with the block 86 and with a collar 114. As discussed above, the opening 90, and thus the pipe 92, is offset slightly from the major axis, or center line of the main support pole. Likewise, the hole 110 in the cylindrical member 108 is offset from the center of the member 108 an equal amount. Thus, it can be seen that there is only one position where the cylindrical member 108 is aligned with the outer diameter of the main support pole 21. Thus, when the member 108 is rotated, it can move from a position in which it is coincident with the main support pole 21 outer diameter, into a position where it is eccentric with respect to the outer diameter of the main support pole 21. This permits a locking between the main support pole and the extension support pole 29, in a manner to be described. Reference should be made to copending application, Ser. No. 944,354, FIG. 2b, which shows a similar locking member used in a different embodiment.

Mounted on the intermediate air hose 102 is an oiler 114. The oiler 114 is a cylindrically-shaped, clear plastic member that has oil therewithin. When the air is provided to the motor, oil is picked up along with the air to lubricate the motor. This oiler 114 is a conventional device and may be optionally used with the present invention. Further, the oiler 114 can be positioned at various points on the intermediate air hose 102.

Coaxial with the main support pole 21, and disposed thereabout, is an extension support pole 29. The extension support pole 29 is a hollow, preferably aluminum, pole, preferably three feet in length. The extension support pole 29 is adapted to abut a sleeve 116 mounted on the main support pole 21, adjacent the control valve 22. This provides a lower limit for the inward extension of extension support pole 29. When in this position, the opposite end 118 of extension support pole 29 just encloses the fitting 100. Disposed at the opposite end 121 of the extension support pole 29 is a rubber or plastic cap 123, shown in FIG. 1, which maintains intermediate support hose 102 centered and free of engagement with the edges of extension support pole 29.

Figure 4:
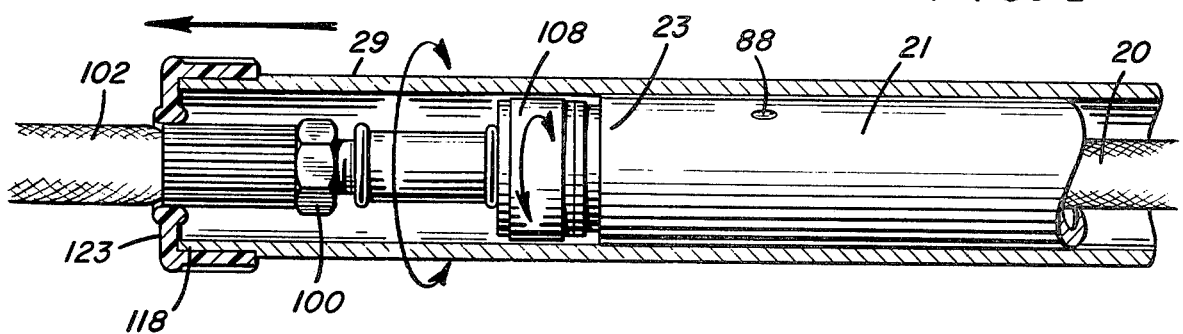
FIG. 4 is a partial cross-section view of the upper end of the main support pole.
Figure 5:
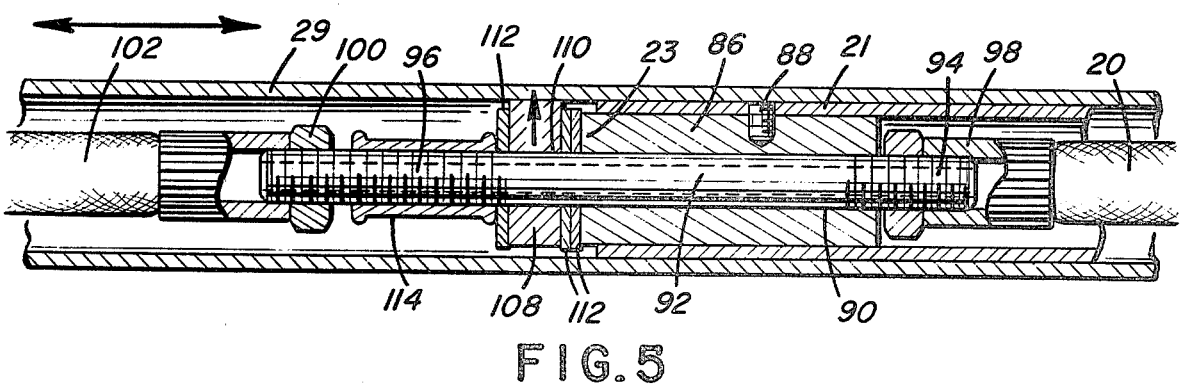
FIG. 5 is a cross-section of the upper end of the main support pole.
Figure 6:
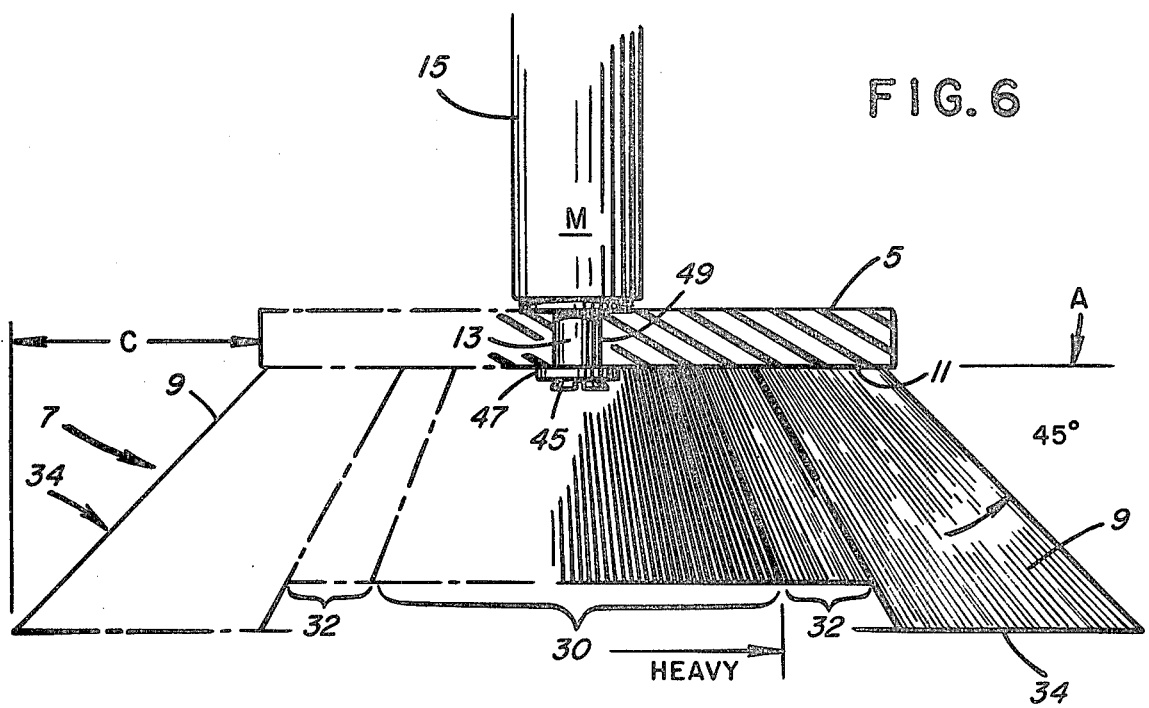
FIG. 6 is a partial cut-away view of the scrubbing brush.
Figure 7:
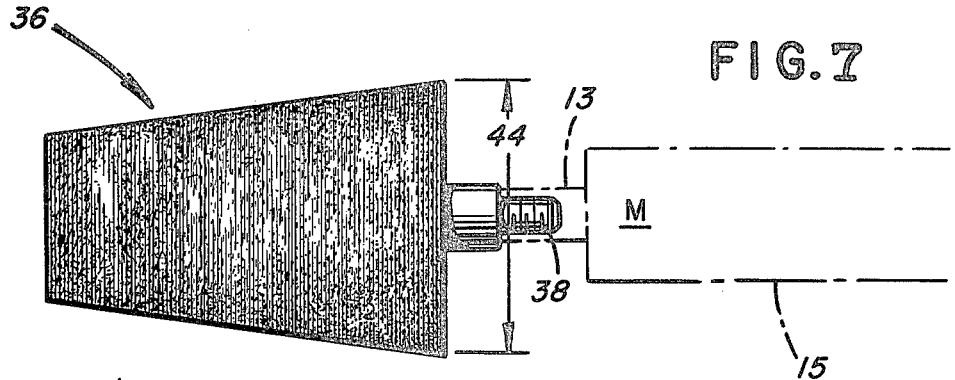
FIG. 7 is the cone brush of the invention.
Figure 8:
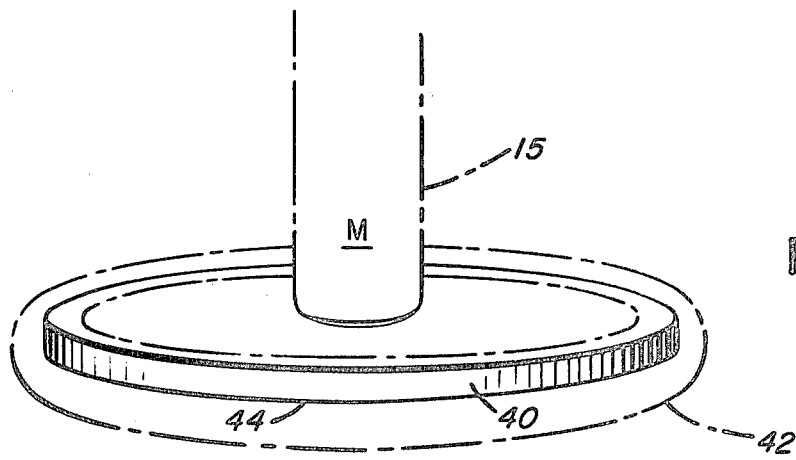
FIG. 8 is the disc attachment of the present invention.

Extension support pole 29 is extendable and can be locked at selected positions with respect to main support pole 21. This locking is effectuated by means of the cylindrical member 108, as described above. As shown in FIGS. 4 and 5, a rotation of the extension support pole 29, in either direction, rotates the cylindrical member 108 eccentric with the main support pole 21 to provide an expansion fit between the extension support pole 29 and the main support pole 21. Rotation can be in either direction.

To use the above-described scrubbing tool 1, the operator will hold the extension support pole 29 and apply the brush member 3 to the surface to be cleaned. A quick turning of the extension support pole 29 in either direction enables the extension support pole 29 to be freed from locking with the main support pole 21, and thus extensible in either direction. A quick twist back will enable the locking to occur. The pivotal movement of main support pole 21 with motor 15 (which, in turn supports the brush), permits a highly maneuverable positioning of the brush adjacent difficult-to-reach and irregularly-shaped surface areas. Regardless of the relative position of motor 15 and the main support pole 21, the slim, compact motor size will not interfere with any irregularly-shaped surfaces on the surface to be cleaned.

The above description is illustrative only, and the invention is not to be limited except by reason of the following claims.

What is claimed is:

1. A lightweight, portable pneumatic powered scrubbing tool comprising a brush means for brushing a surface; a pneumatic powered motor having a motor drive shaft connected to said brush means for rotating said brush means, said motor being mounted adjacent to said brush means and of a size so as not to extend beyond the periphery of said brush means, an elongated, tubular main support pole, means for pivotally connecting one end of said main support pole to said motor, a first flexible pneumatic fluid supply hose positioned substantially along the entire length of said main support pole and disposed therewithin, means for interconnecting said first flexible pneumatic fluid supply hose with said motor to provide pneumatic fluid to said motor for powering the motor, an elongated, tubular extension support pole coaxial with said main support pole and locking means for selectively positioning and locking said extension support pole to said main support pole at selected positions along the length of the main support pole by twisting said extension support pole and main support pole with respect to each other, in either direction.

2. The scrubbing tool as claimed in claim 1 wherein said locking means comprises a substantially cylindrical member, having a diameter substantially equal to the outer diameter of said main support pole, means for rotatably mounting said cylindrical member adjacent the end of the main support pole opposite the motor and eccentric to the major axis of the main support pole, wherein the circumferential side of the cylindrical member engages the inner surface of the extension support pole, and is rotatable by relative turning of the extension and main support poles to provide locking therebetween.

3. The scrubbing tool as claimed in claim 2 wherein said means for rotatably mounting said cylindrical member adjacent the end of the main support pole comprises a mounting block fixedly mounted within the end of the main support pole, a hollow pipe extending through the mounting block having one end positioned within the main support pole and the other end positioned outside the main support pole, said pipe displaced from the longitudinal axis of the main support pole, and means for rotatably supporting said cylindrical member about the pipe end outside of the main support pole.

4. The scrubbing tool as claimed in claim 3 wherein said first flexible pneumatic fluid supply hose is connected to said pipe end inside the main support pole.

5. The scrubbing tool as claimed in claims 3 or 4 wherein an intermediate flexible fluid supply hose is connected, at one end, to the end of the pipe outside of the main support pole, the other end of said intermediate hose connected to a quick disconnect fitting means for connection to a pneumatic fluid source.

6. The scrubbing tool as claimed in claim 5 further comprising an oiler means for providing oil to the pneumatic fluid, said oiler means connected to said intermediate hose.

7. The scrubbing tool as claimed in claim 3, wherein the end of the hollow pipe outside the main support pole is threaded, and wherein said means for rotatably supporting said cylindrical member about the pipe end outside of the main support pole comprises a collar positioned about the end of the hollow pipe for retaining rotatably the cylindrical member adjacent said mounting block.

8. The scrubbing tool as claimed in claim 1 wherein said motor comprises a compressed air-powered motor of substantially cylindrical shape, wherein the length of said motor is substantially greater than its diameter, said motor drive shaft extending from one end of the motor along its major axis.

9. The scrubbing tool as claimed in claim 1 wherein said means for interconnecting said first flexible pneumatic fluid supply hose with said motor comprises a second flexible pneumatic fluid supply hose, one end connected to said motor, the other end connected to a union, said union having one end disposed within said main support pole and connected to said first fluid supply hose, the other end of said union extending through an opening in the main support pole.

10. The scrubbing tool as claimed in claim 9 wherein a shut-off and control valve is interconnected with said union.

11. The scrubbing tool as claimed in claim 1 wherein said means for pivotally connecting said one end of said main support pole to said motor comprises a motor sleeve fixedly secured to said motor around the circumference thereof, said motor sleeve including a radial flange, a U-shaped bracket unitary with a cylindrical rod, said U-shaped bracket pivotally connected to said radial flange, said cylindrical rod fixedly secured within a hollow, tubular portion of said main support pole at said one end of the main support pole.

12. The scrubbing tool as claimed in claim 11, wherein said U-shaped bracket is freely pivotably connected to said radial flange.

13. The scrubbing tool as claimed in claim 1 wherein said brush means comprises a scrubbing brush member having a substantially circular mounting plate, and a plurality of bristles affixed to one surface of the plate, at least a portion of said bristles affixed to said plate adjacent the periphery thereof and directed at an angle outwardly therefrom.

14. The scrubbing tool as claimed in claim 1 wherein said brush means comprises a conically-shaped brush.

15. The scrubbing tool as claimed in claim 1 wherein said brush means comprises a substantially circular disc, and means for interchangeably connecting a cleaning pad thereto.

16. The scrubbing tool as claimed in claim 15, wherein said cleaning pad comprises a cloth mitten disposed about the disc.

17. The scrubbing tool as claimed in claim 15 wherein one surface of the disc is burred to frictionally engage a pad.

18. The scrubbing tool as claimed in claim 1, wherein said means for pivotally connecting one end of said main support pole to said motor comprises a freely pivotable connecting means.

19. A lightweight, portable, pneumatic powered scrubbing tool comprising a brush means for brushing a surface; a pneumatic powered motor hanving a motor drive shaft connected to said brush means for rotating said brush means, said motor being mounted adjacent to said brush means and of a size so as not to extend beyond the periphery of said brush means, an elongated, tubular main support pole, means for pivotally connecting one end of said main support pole to said motor, a first flexible pneumatic fluid supply hose positioned substantially along the entire length of said main support pole and disposed therewithin, means for interconnecting said first flexible pneumatic fluid supply hose with said motor to provide pneumatic fluid to said motor for powering the motor, an elongated, tubular extension support pole coaxial with said main support pole and locking means for selectively positioning and locking said extension support pole to said main support pole at selected positions along the length of the main support pole, wherein said brush means comprises a scrubbing brush member having a substantially circular mounting plate, and a plurality of bristles affixed to one surface of the plate, at least a portion of said bristles affixed to said plate adjacent the periphery thereof and directed at an angle outwardly therefrom, wherein said plurality of bristles comprises a plurality of stiff bristles affixed to said mounting plate about the center of the plate, an annular ring of soft bristles affixed to the mounting plate about the stiff bristles, an outer annular ring of soft bristles affixed to the mounting plate about the annular ring of soft bristles, and extending to the periphery of the plate, the length of the outer annular ring of soft bristles substantially longer than the other bristles.

20. The scrubbing tool as claimed in claim 19 wherein the outer annular ring of soft bristles are affixed to the plate at an angle thereto and extending outwardly of the plate periphery.

* * * * *